Aug. 24, 1965  H. A. SHERWOOD  3,202,314
SERVICE INDICATOR
Filed July 10, 1964  6 Sheets-Sheet 1
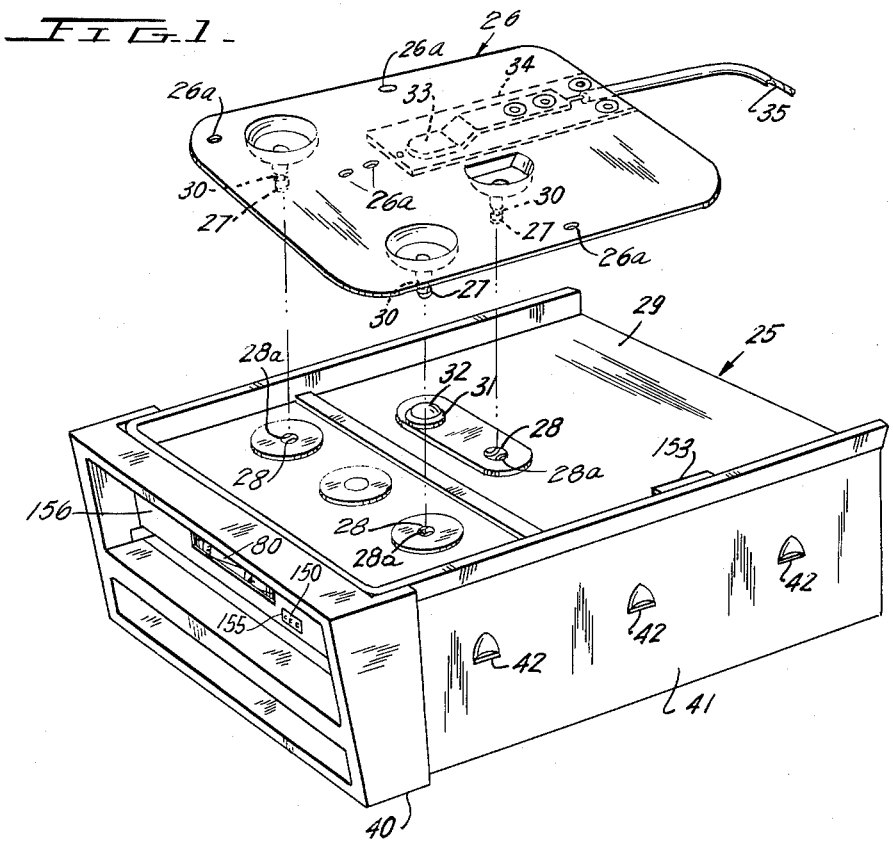
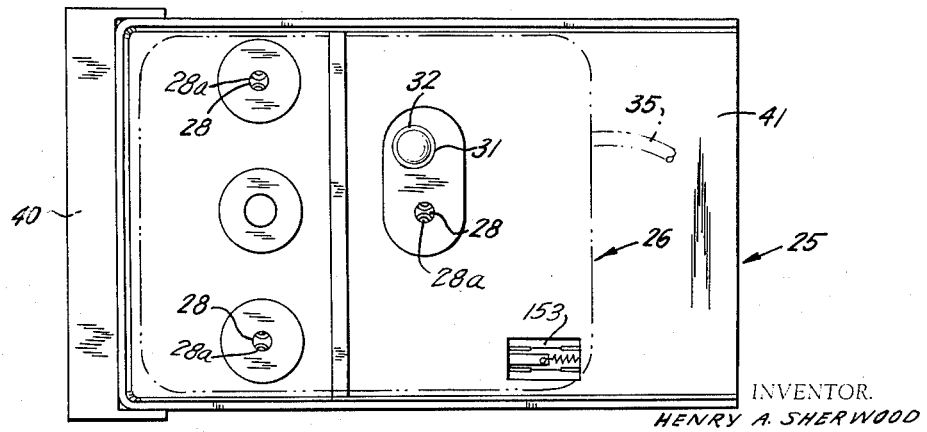
INVENTOR.
HENRY A. SHERWOOD
BY
OSTROLENK, FABER, GERB & SOFFEN
ATTORNEYS

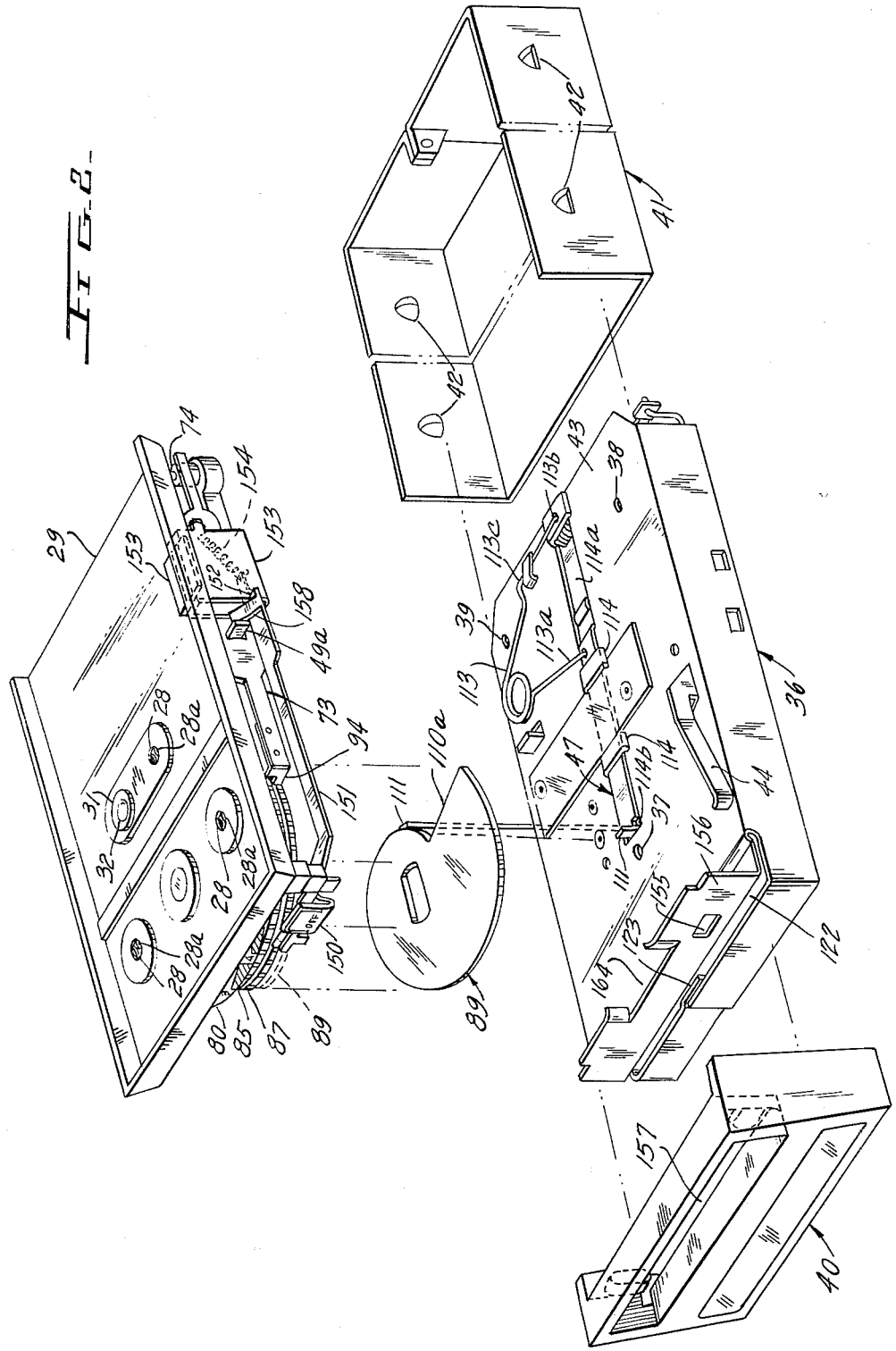

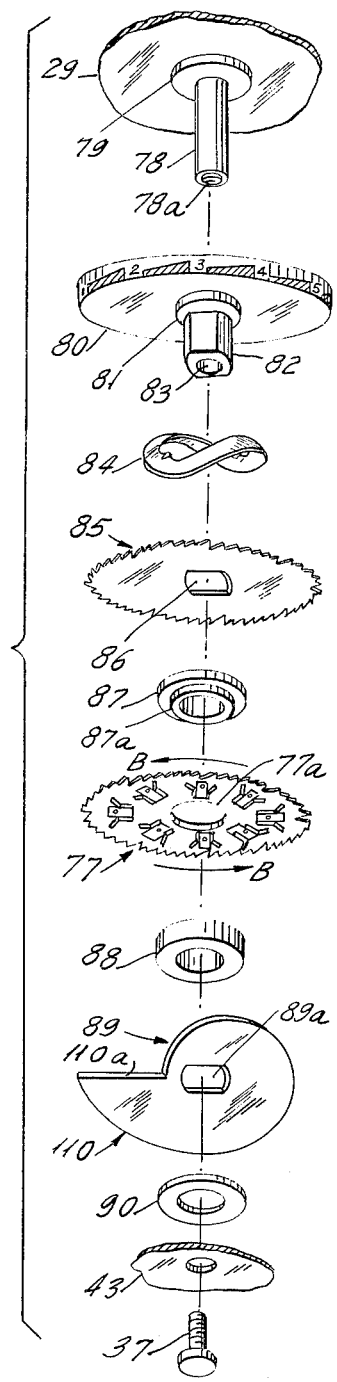
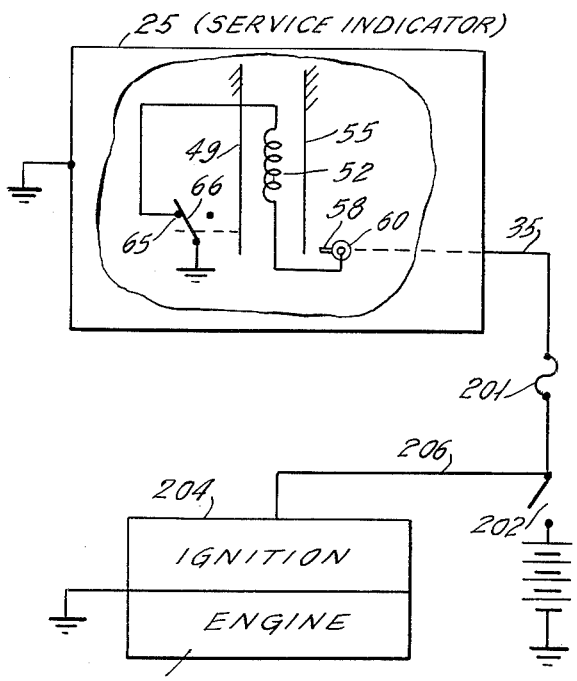

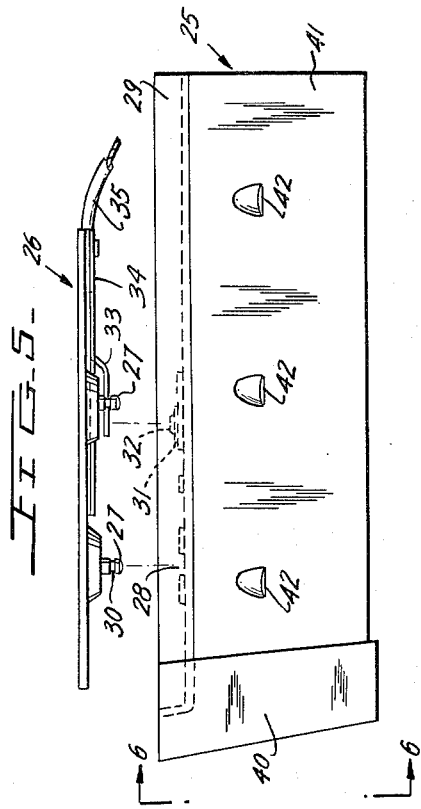
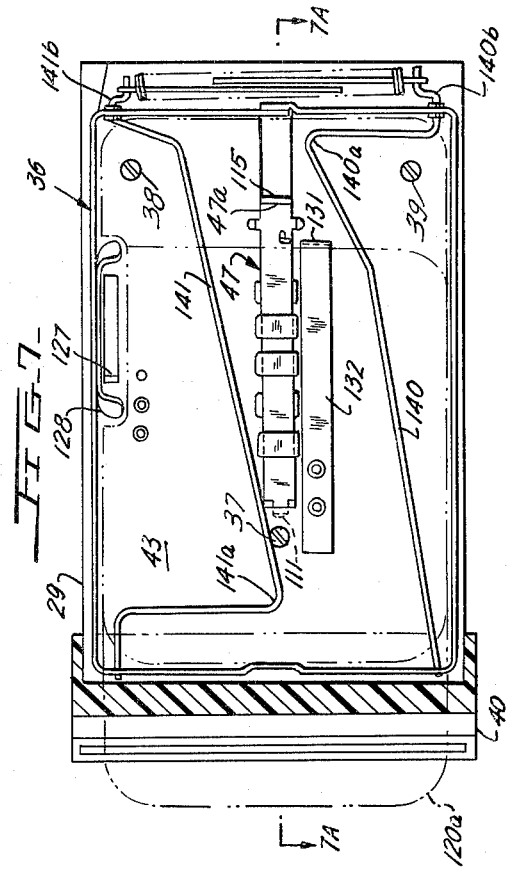
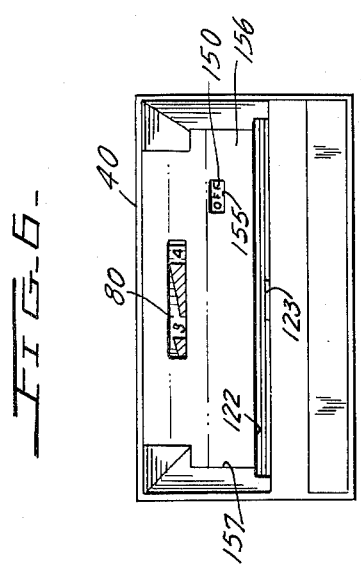
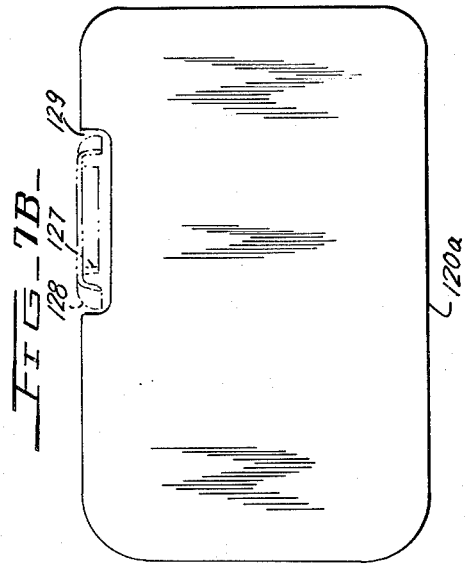

Aug. 24, 1965
H. A. SHERWOOD
3,202,314
SERVICE INDICATOR
Filed July 10, 1964
6 Sheets-Sheet 5
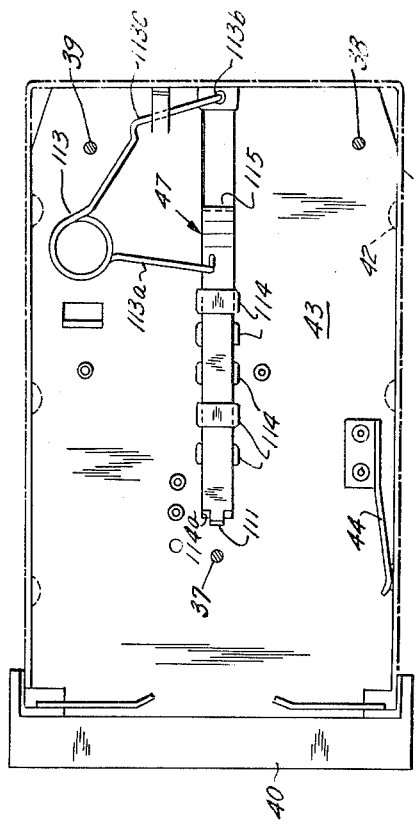
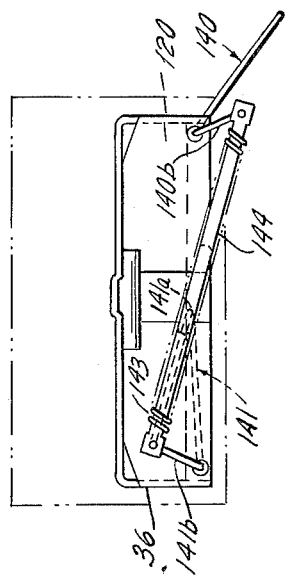
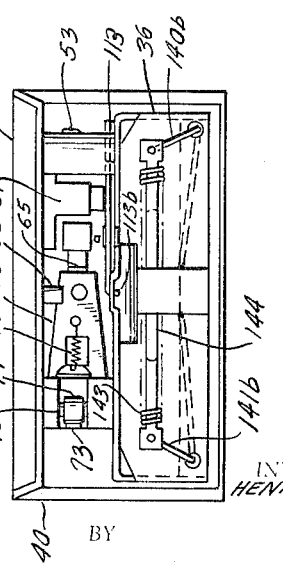
INVENTOR.
HENRY A. SHERWOOD
BY
OSTROLENK, FABER, GERB & SOFFEN
ATTORNEYS

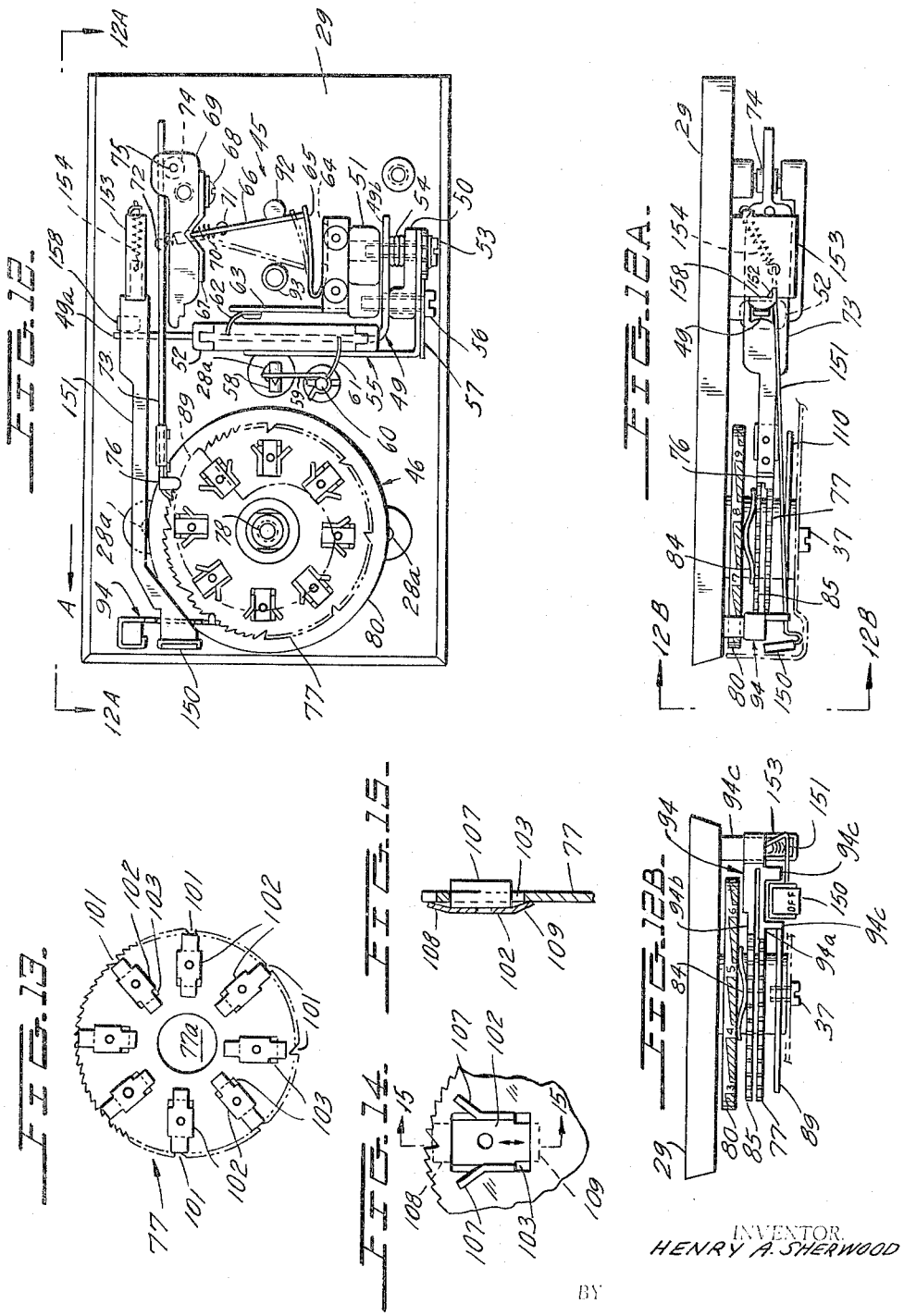

United States Patent Office 3,202,314
Patented Aug. 24, 1965

3,202,314
SERVICE INDICATOR
Henry A. Sherwood, Short Hills, N.J., assignor to U.S.
Servicator Corp., Clifton, N.J., a corporation of
Delaware
Filed July 10, 1964, Ser. No. 381,871
25 Claims. (Cl. 221—2)

This application is a continuation-in-part of my copending application Serial No. 301,864, filed August 13, 1963, which is a continuation-in-part of my applications Serial No. 83,346, filed January 17, 1961, and Serial No. 154,311, filed November 22, 1961, now abandoned. Application Serial No. 83,346 discloses an electro-mechanical prime mover cyclically operable to achieve a timed action or series of timed actions while in the other two applications the prime mover is set forth in combination with novel means for ejecting a service indicating card from a stack of cards stored in a compartment.

Power units of the type to which the present invention relates have been sugegsted heretofore but so far as can be determined they have proved to be impractical and unreliable because of variables which exist or develop in the inter-relation of their electrical and mechanical functions. The present invention overcomes this undesirable defect of the prior art by providing a motor constructed to assure its proper and accurate functioning, which is attained by the provision of means for establishing a definite interrelation of all of its operating parts to effect a fixed sequence of action of these parts.

To this end, the present invention in its broad aspects contemplates a power unit having drive and driven means connected by power transmission means, wherein the drive means comprises a bimetallic element mounted to move in response to the application of heat thereto, and means for applying the heat intermittently to effect a cyclic movement of the bimetallic element upon its being successively heated and then allowed to cool during each cycle.

More specifically, the invention provides a bimetallic element surrounded by an electric resistance coil arranged in an electric circuit which is opened and closed by a rockable over-center spring switch, the switch in turn being actuated by the movement of the bimetallic element to effect rocking of the switch from "on" to "off" position, and vice versa. The bimetallic element is equipped with a pawl which engages with the teeth on a ratchet wheel so that when the element moves responsive to being heated by the resistance coil, movement of the element is translated through the pawl to turn the ratchet wheel. The pawl arm connected to the bimetallic element and movable with it serves as an anchor for one end of the switch spring, and when the element has moved sufficiently to rotate the ratchet wheel through a distance equal to the pitch of the tooth engaged by the pawl, the arm to which the spring is anchored will have moved a distance sufficient to carry the spring beyond center, whereupon it exerts a force which rocks the switch to break the electric circuit and allow the bimetallic element to cool and return to its original position. In so doing, the spring is returned past center, whereupon it rocks the switch back to its original position to reestablish the electric contact and commence next cycle of operation.

It is a prime feature of the invention that the power unit achieves its reliability from the concept of an inter-related adjustability of its operating parts. Thus, the bimetallic element is adjustable to place it under tension or pre-lead it beyond the point where it is affected by the temperature of the atmosphere. Such adjustment determines the initial positions of the element, the driving pawl, the ratchet wheel and the switch spring anchoring arm, and in this condition of the parts the switch spring is accurately located on the arm, the "on" and "off" positions of the switch are properly located and a holding pawl is properly located relative to the teeth of the ratchet wheel, its function being to prevent rotation of the wheel in a direction reverse to that in which it is being driven.

In order not to upset the settings of the holding pawl and switch spring and also to insure predictable operation pre-loading of the bimetallic element is done at the anchored end thereof. That is, means are provided to adjust the anchored end of the bimetal relative to its support while the free end of the bimetal rests against a fixed stop when the bimetal is cool. With this arrangement the free end of the bimetal deflects the same distance during each cycle regardless of the degree of pre-loading.

Each card in the stack is provided with a keying notch which cooperates with a keying formation in the magazine to assure that the stack is properly oriented. Proper orientation is essential since the cards in the stack are arranged in a programmed sequence. That is, each card does not contain the same servicing instructions. For example, after fifty hours of operation a card is ejected to indicate that oil is to be changed and after four hundred hours a card is ejected to indicate that spark plugs are to be cleaned. Even though each of the cards contains different servicing instructions the shape of all cards, including the keying notch, is identical thereby materially simplifying the construction of the ejecting mechanism.

The keying notch serves a dual function by cooperating with a hold back spring to prevent the card from being fully ejected upon the sudden release of the actuator arm spring energy. With the card fully within the magazine the hold back spring is disposed within the keying notch. As the card is being ejected the spring engages the card edge portion defining one end of the notch. The momentum of the card being ejected is not sufficient to overcome the spring pressure so that card movement is arrested with the card partially ejected.

Since the card is partially ejected it is conspicuous yet it cannot be accidentally dislodged. However, the spring pressure is readily overcome as the partially ejected card is intentionally removed by the serviceman. When the card reaches this partially ejected position a stop means moves behind the trailing edge of the card and blocks any attempt which may be made to force the card back into the magazine.

The typical device to be serviced is an automobile engine and related parts requiring lubrication. The power unit is energized only when the automobile ignition is on. Thus, the service indications will be based upon time of engine operation rather than upon the traditional measure of miles driven. The traditional measure is merely for average conditions and does not take into account the occasions when the engine is driven at either very light or very heavy loads for the entire service period. City driving, since it is more taxing upon an automobile engine, requires that servicing be performed after fewer miles have been driven than in the case of road driving which subjects the engine to relatively slight wear. With time as the measuring standard fewer city miles than country miles will have been driven in the periods between servicings.

Further application for the instant invention is found in the servicing of fork lifts, mobile cement mixers, traveling crane and the like. In each of these devices a major portion of engine wear is unrelated to mileage.

Accordingly, a primary object of this invention is to provide a novel construction for a service indicating unit which is extremely reliable and accurate over an extended period of time.

Another object is to provide a novel construction for a device of this type in which response is essentially a function of time rather than mileage.

Still another object is to provide a novel service indicating device in which there is a stack of service instruction containing cards arranged in a predetermined sequence in a stack compressed by a lever loading arrangement of a differential nature applying substantially even forces at the front and back of the stack regardless of stack height.

Yet another object is to provide a device of this type in which a spring loaded cam is utilized as a means for catapulting the cards so that a long card stroke is obtained with a small cam.

A further object is to provide a device of this type having a bimetal drive means with provisions for preloading adjustments at the anchoring end of the bimetal.

A still further object is to provide a device of this type having novel means for adjusting the operational time.

Another object is to provide a device of this type having visual means for indicating when the device is functioning as well as visual means for indicating the portion of the cycle which has elapsed.

Another object is to provide a device of this type having a safety device in addition to a fuse to prevent overheating and permanent damage to the device.

These as well as further objects of this invention shall become readily apparent after reading the following description of the accompanying drawings in which, FIGURE 1 is a perspective of a partially assembled service indicating device constructed in accordance with the teachings of the instant invention together with its mounting means.

FIGURE 2 is an exploded perspective showing the interrelation between main assemblies of the service indicating device of FIGURE 1.

FIGURE 3 is an exploded perspective showing the ratchet and indicating wheels as well as their mounting elements.

FIGURE 4 is a plan view of the service indicating device of FIGURE 1.

FIGURE 5 is a side elevation of the service indicating device and its mounting means.

FIGURE 6 is a front elevation looking in the direction of arrows 6—6 of FIGURE 5.

FIGURE 7 is a bottom view of the device with its cover removed.

FIGURE 7A is a cross-section taken through like 7A—7A of FIGURE 7 looking in the direction of arrows 7A—7A.

FIGURE 7B is a plan view of one of the service indicating cards.

FIGURE 8 is a rear view of the magazine showing the spring loading means for the card stack.

FIGURE 9 is a side elevation of the service indicating device with its cover removed and the rear wall of the card magazine broken away.

FIGURE 10 is a rear view of the elements of FIGURE 9 looking in the direction of arrows 10—10.

FIGURES 11 and 12 are cross-sections taken through lines 11—11 and 12—12, respectively, of FIGURE 9 looking in the directions of the respective arrows 11—11 and 12—12.

FIGURE 12A is a side elevation looking in the direction of arrows 12A—12A of FIGURE 12.

FIGURE 12B is a front end view looking in the direction of arrows 12B—12B of FIGURE 12A.

FIGURE 13 is a plan view of the primary ratchet wheel.

FIGURE 14 is an enlarged fragmentary view of the other side of the primary ratchet wheel detailing the mechanically adjustable timing element.

FIGURE 15 is a cross-section taken through line 15—15 of FIGURE 14 looking in the direction of arrows 15—15.

FIGURE 16 is a schematic showing the indicating device operatively connected in an automotive system.

Now referring to the figures. Service indicating device 25, constructed in accordance with the teachings of the instant invention, is electrically and mechanically connected to mounting plate 26. The mechanical connection is achieved by means of three pins 27 (FIGURE 1) projecting downward from plate 26 and entering three apertures 28 in the plate-like frame member 29 of device 25. In a manner well known to the fastening art, spring members (28a) mounted to the under surface of member 29 enter the annular depressions 30 near the free ends of pins 27 thereby retaining indicating device 25 mechanically mounted to plate 26. Non-conducting element 31 insulates contact member 32 from plate 29 and positions contact 32 for engagement with spring contact member 33 carried by and sandwiched between two insulating sheets 34 mounted to the bottom surface of plate 26. Insulation cover conductor 35 extending from contact member 33 is, as will be hereinafter explained, connected to a source of electrical energy for actuating service indicating device 25.

Service indicating device 25 also includes rectangular card holding magazine 36 secured to frame member 29 by means of screws 37 through 39 (FIGURE 7), molded face plate 40 force fitted to magazine 36, and slidably removable cover 41 providing a closure for magazine 36 as well as for the space between frame plate 29 and the top of magazine 36. Indented formations 42 in the sides of cover 41 guide cover 41 into closed position and lie adjacent to the top surface 43 of magazine 36. Leaf spring member 44 (FIGURE 2) is forced inwardly as cover 41 slides into position and thereafter exerts a friction retaining force on cover 41.

Mounted to the inside of frame plate 29 is electromechanical drive means 45 (FIGURE 12) and power transmission means 46. The latter transmits power from drive means 45 to driven means 47 (FIGURE 2) mounted to the upper surface of magazine 36. The elements constituting drive means 45 and power transmission means 12 are mounted to the lower side of frame plate 29 and for the most part are positioned by being fitted to one another or by means of embossments formed integrally with frame plate 29.

Drive means 45 includes L-shaped bimetal strap 49 one leg 49b of which extends between embossments 50, 51. Leg 49b is designated as the mounting leg while the other leg is free to deflect when bimetal 49 is subjected to changes in temperature.

Screw 53 extends through a clearance aperture in embossment 50 through coil spring 54 interposed between embossment 50 and bimetal 49 and is received by a threaded aperture in the mounting leg 49b. A clearance aperture is provided in embossment 51 to permit screw 53 to project through bimetal 49 without interference.

A safety device in the form of another L-shaped bimetal 55 is secured in place by screw 56 which passes through aligned clearance apertures in plate 57, the mounting leg of bimetal 55, embossment 50 and driving bimetal 49 to be received by a threaded aperture in embossment 51. It is noted that screw 53 also passes through a clearance aperture in the mounting leg of bimetal 55.

The deflectable end of bimetal 55 extends generally parallel to the deflectable leg of bimetal leg 49 and lies adjacent to heating coil 52. Should excessive heat be generated within indicating device 25 safety bimetal 55 will deflect sufficiently to engage contact 58 mounted at the free end of conducting clip 59 which is pivotally mounted to post 60 connected to contact 32. One end 61 of coil 52 is electrically connected to post 60 while the other end 62 is electrically connected to one end of conducting member 63. The latter is carried by an insulating block 64 mounted to embossment 51. Member 63 is constructed of electrically conducting sheet material and includes contact member 65 engageable with one end of switch arm 66.

The other end of arm 66 is bifurcated and rests against the V-shape depression in conducting member 67 mounted by screw 68 to embossment 69 of frame member 29. A complimentary V-shaped notch in embossment 69 serves to accurately position conducting member 67. Member 67 and embossment 69 are provided with aligned elongated clearance slots having coiled tension spring 70 movable therethrough. End 71 of spring 70 is secured to contact arm 66 while end 72 is connected to driving pawl 73 near the rear end thereof. The portion of pawl 73 to the rear of spring 72 is supported by roller 74 freely mounted on pin 75 between spaced arms formed at the rear of embossment 69.

Spring member 76 is fixedly mounted at the forward end of pawl 73. At a point intermediate spring 72 and member 76 pawl 73 is provided with a transverse slot which recceives the reduced free end 49a of bimetal 49. The tension exerted by spring 70 firmly seats pawl 39 on bimetal 49. When bimetal 49 is heated the free end thereof deflects in a forward direction (arrow A of FIGURE 12) causing driving pawl 73 to move along its axis in a forward direction with member 76 engaging a tooth of primary ratchet wheel 77 thereby driving the latter in a counterclockwise direction with respect to FIGURE 12. Primary ratchet wheel 77 is freely mounted for rotation about circular post 78 near the lower end thereof.

As best seen in FIGURE 3, post 78 projects downwardly from boss 79 formed in the bottom surface of frame plate 29. The upper surface of indicating wheel 80 rests against boss 79 while the lower surface of wheel 80 is provided with circular boss 81 and a downwardly projecting post 82 having flat keying sides. Circular post 78 extends through circular bore 83 extending axially through post 82. Circular spring 84 extends over post 82 and is positioned by boss 81. Spring 84 is constructed of sheet material cut as a ring with portions downwardly bent to engage the upper surface of secondary ratchet wheel 85.

The latter is provided with a central aperture 86 of a shape complementary to post 82. Stepped circular spacer 87 fits over post 82 and is disposed with its smaller diameter annular edge 87a serving as a bearing for primary ratchet wheel 77 by being closely fitted to the central circular aperture 77a in wheel 77. Bearing washer 88 mounted to post 82 is interposed between primary ratchet wheel 77 and cam wheel 89. The latter is provided with mounting aperture 89a of a shape complementary to post 82. Another washer spacer 90 is mounted to post 82 to space cam wheel 89 from the upper surface 43 of magazine 36. Screw 37 extending through a clearance aperture in the upper wall of magazine 36 is received by threaded aperture 78a in the lower end of circular post 78.

Thus, it is seen that secondary ratchet wheel 85 and cam wheel 89 are both keyed to post 82 so that wheels 81 and 85 together with cam 89 rotate in unison about post 78 as a center. It is also seen that primary ratchet wheel rotates freely about circular post 78 as a center.

Controlled heating of bimetal 49 is achieved by means of coil 52 which is mounted to the deflectable leg. As bimetal 49 is heated the free end 49a thereof moves forwardly thereby driving pawl 73 in a forward direction with spring member 76 driving primary ratchet wheel 77 in the direction indicated by arrow B of FIGURE 3. As driving pawl 73 moves forward spring end 72 also moves forward and at a point where spring 70 is over center with respect to the pivot for switch arm 66 the latter will move with a snap action from engagement with stop 92 into engagement with stop 93 formed integrally with frame plate 29 on the lower surface thereof. As clearly seen in FIGURE 12, when switch arm 66 rests against stop 92 the upper end of arm 66 is in engagement with contact 65 while when arm 66 rests against stop 93 engagement between arm 66 and contact 65 is broken. As will be hereinafter explained, when arm 66 is in engagement with contact 65 the circuit for energizing heater 52 is closed and when arm 66 is free of engagement with contact 65 this circuit is broken.

The elements of indicating device 25 are so proportioned that after the temperature of heater 52 reaches the operating range, during each heating portion of the heating-cooling cycle, primary ratchet wheel 77 will be driven a distance greater than one tooth pitch and less than the pitch of two teeth of wheel 77. Each time ratchet wheel 77 advances one tooth pitch holding pawl finger 94a (FIGURE 12B) falls behind a tooth of wheel 77 thereby preventing a reverse rotation of wheel 77. Finger 94a is part of spring member 94 friction fitted upon post 94c projecting downward from plate 29. Member 94 has another tooth 94b which lies substantially parallel to tooth 94a and acts as holding pawl for secondary ratchet wheel 85.

As best seen in FIGURE 13, the periphery of primary ratchet wheel 77 is provided with a plurality of substantially equally spaced teeth. However, there are eight teeth each given the same designation 101 which are deeper than the remaining teeth of wheel 77. Whenever spring member 76 is at the bottom of a deep tooth 101 of primary ratchet wheel 77 member 76 also engages a tooth in the periphery of secondary ratchet wheel 85 so that upon the next forward movement of driving pawl 73 secondary wheel 85 will be rotated in a counterclockwise direction with respect to FIGURE 12 by a distance equal to one tooth pitch. However, rotation will not be imparted to secondary ratchet wheel 85 as primary ratchet wheel 77 is stepped until such time as holding pawl finger 94a falls to the bottom of a deep tooth 101. This is due to the fact that when spring member 76 is at the bottom of one of the shallow notches between deep teeth, member 76 is positioned too far from the axis of secondary ratchet wheel 85 to engage any of the teeth in the periphery thereof.

Thus, it is seen that with spring member 76 of driving pawl 73 free to enter the bottom of each of the eight deep teeth 101, secondary ratchet wheel 85 will be stepped by a distance equal to the pitch of only eight teeth during a period when primary ratchet wheel 77 makes a complete revolution. In order to operate secondary ratchet wheel 85 at a more reduced speed relative to a primary ratchet wheel 77 it is only necessary to prevent spring member 76 from reaching the bottom of one or more of the deep teeth 101. This is readily accomplished by providing blocking members 102 mounted to primary ratchet wheel 77 for radial movement between an active and an inactive position. When a member 102 is moved radially inwardly it is in an inactive position since it does not block a deep tooth 101. However, when a member 102 is moved radially outward the outer portion thereof extends over a deep tooth 101 thereby preventing spring member 76 from reaching the bottom of this deep tooth. Under these circumstances member 76 moves no more inwardly than it would were it to fall behind any of the short teeth between deep teeth 101.

Each of the members 102 is constructed of sheet spring material and is slidably mounted in one of the windows 103 in primary ratchet wheel 77. The ends of member 102 rest against upper surface 106 of wheel 77 with a portion extending through aperture 103 and being deformed at 107 to retain member 102 mounted to wheel 77. The deformation of inclined portions 108, 109 at the ends of member 102 provides a friction force to retain member 102 in its adjusted position.

Since cam wheel 89 and timing indicator wheel 80 as well as secondary ratchet wheel 85 are all keyed to post 82 all three elements will rotate in unison. Thus, as secondary cam 85 rotates cam wheel 89 will also rotate with the camming edge 110 thereof in engagement with upturned end 111 (FIGURE 2) of driven member 47 forcing the latter rearwardly (to the right with respect to FIGURE 11). This causes torsion spring 113 to become loaded. The latter is secured at one end 113a to driven member 47 while its other end is anchored at two points 113b, 113c to the upper wall of magazine 36. Guide straps 114 and slot 114a mount driven member 47 for linear movement along the axis thereof. The end 115 (FIGURE 7A) of driven member 47 is disposed within magazine 36 and is movable by cam 110 to a position just to the rear of the trailing edge of the topmost card 120a in the program stack of cards 120 disposed within magazine 36. Shortly after driven member 47 reaches its most rearward position projection 111 moves into the sharp dropoff portion 110a of cam edge 110 and the energy stored in spring 113 is suddenly released thereby driving member 47 forwardly with knife edge portion 47a thereof engaging the rear edge of card 120a. This catapults card 120a through the narrow slit 122 (FIGURE 2) at the front of magazine 36. It is noted that the central portion of slit 122 is narrowed by formation 123 so that the height at the central portion of slit 122 will permit the passage therethrough of only one card. This narrowing at the center of slit 122 while permitting the ends thereof to remain relatively high serves to prevented jamming due to warped cards in stack 120.

As the topmost card 120 is catapulted forward by driven member 47 the inertia of card 120a causes it to move forward of the most forward position of driven member formation 115. This movement is substantially unimpeded as until such time as card 120a engages the upper tip of hold back finger 127 (FIGURE 7). Finger 127 is a resilient member which exerts a friction force against the now partially ejected card 120a thereby retaining the latter in the phantom position shown in FIGURE 7. Finger 129 is formed integrally with the member constituting the generally U-shaped keying formation 128 which cooperates with keying formation 129 in the cards of stack 120 to assure that they are inserted into magazine 36 only in a predetermined position. It should be apparent that initial ejecting movement of card 120a is unimpeded since hold back finger 127 is disposed within card notch 129.

By referring to FIGURE 7A it is also seen that by the time movement of card 120a is arrested the rear edge thereof is in a position forward of stop means 131 which projects downwardly from the rear end of spring member 132 mounted inside of magazine 36. Any attempt to move the partially ejected card 120a back through slit 122 into magazine 36 will be blocked by projection 131.

In order to assure that the ejecting operation takes place without jamming it is necessary that stack 120 be biased upwardly. It has been found that the biasing means performing this function must exert a substantially uniform force regardless of the size of the stack and that this force must be exerted at both ends of the stack. In order to accomplish the latter individual pivoted members 140, 141 (FIGURE 7) are provided. Each of these members is constructed of stiff wire with a section of modified V-form extending between pivots at opposite ends of magazine 36. Members 140, 141 are so mounted and constructed that it is only the apex of each V which contacts the bottom of stack 120. Thus, the apex 141a of holding member 141 engages stack 120 near the forward end thereof at a point substantially midway between the sides thereof while the apex 140a of holding member 140 engages the bottom of stack 120 near the rear thereof. The rear ends of each of the members 140, 141 are each provided with crank portions 140b and 141b, respectively, which extend to the rear of magazine 36 and are positioned out of the general plane in which the V-portions of members 140, 141 lie. In FIGURE 8 member 140 is in open position and member 141 is in closed position. Coiled compression spring 143 is mounted to expandable guide rod 144 pivotally connected at its opposite ends to the free ends of crank portions 140b, 141b. As seen in FIGURE 10, with apices 140a, 141a in engagement with the bottom of card stack 120 compression spring 143 acts to force crank portions 140b, 141b away from one another thereby pivoting members 140, 141 in opposite directions.

Since there are pivotal connections between guide rod 144 and cranks 140b, 141b the angle of spring 143 relative to cranks 140b, 141b changes in accordance with the height of the stack of cards 120 within magazine 36. That is, when the stack of cards 120 is relatively low, spring 143 acts almost at right angles to crank portions 140b and 141b so that almost the entire spring force at this time acts to produce a turning moment. However, at this time spring 143 is in an expanded condition so that the force exerted thereby is relatively low. As the size of stack 120 increases spring 143 is compressed so that the force exerted thereby is relatively low. As the size of stack 120 increases spring 143 is compressed so that the force exerted thereby is increased. However, at this the angle between spring 143 and crank portions 140b, 141b is increased so that the component of force acting perpendicular to crank portions 140b, 141b is a lesser percentage of the force exerted by spring 143 than in the case where the stack 120 was relatively low. Thus, it is seen that as the force exerted by spring 143 increases the percentage of this force acting upon holding members 140, 141 decreases, the result being that the force acting upon the topmost card in stack 120 is substantially the same regardless of the height of stack 120.

An indication of whether service indicator 25 is energized is provided by indicating means 150 (FIGURES 2, 9, 12A) carried at the forward end of elongated member 151. Member 151 is pivoted near its other end in V notch 152 in the spaced walls of U-shaped member 153 extending downwardly from frame plate 29. Tensioned coil spring 154 positioned between the arms of member 153 is connected to member 151 at a point to the rear of pivot notch 152 and is connected to member 153 at a point above notch 152 and to the rear of the securement point of spring 154 to member 151. Thus, spring 154 biases member 151 in a counterclockwise direction with respect to FIGURE 2. This positions the blank portion of indicating means 150 opposite window 155 in the upturned portion 156 at the forward end of the upper wall of magazine 36. Window 155 is aligned with a portion of the cut out 157 in the molded face piece 40. Downward movement of indicator means 150 is limited through its engagement with the top 43 of magazine 36.

Upward extension 158 of member 151 in the region of pivots 152 is engaged by the free end 49a of bimetal 49 when bimetal 49 is cold. Under these circumstances bimetal 49 forces member 151 in a clockwise direction with respect to FIGURE 2, with this movement being limited through the engagement between extension 158 and member 153 (see FIGURE 9). With member 151 moved clockwise, the OFF indicium carried by indicator means 150 is viewable through window 115 and cut out 157 to show that service indicator 25 is deenergized. It is noted that the only time the OFF indicium appears at window 155 is when bimetal 49 is truly cold.

That is, when bimetal 49 is cold it moves to a preloaded position against projection 158 with the amount of preloading having been determined by the adjustment of screw 53 (see FIGURE 12) which acts on the anchored end of bimetal 49 to boldly pivot bimetal 49. When the heating coil 52 for bimetal 49 is initially energized free end 49a deflects thereby moving driving pawl 73 in a forward direction. This moves the bimetal free end 49a clear of extension 158 so that spring 154 pivots member 151 in a counterclockwise direction to the position of FIGURE 12, and the OFF indicia no longer appears at window 155. During normal operation of service indicator 25 opening of switch 65, 66 deenergizes coil 52 for a period of time sufficient to enable driving pawl 73 to move rearward by a distance equal to the pitch between one and two teeth. However, during this entire rearward movement of bimetal free end 49a it does not engage extension 158 so that the OFF indicia is not viewable through window 155. It is only upon complete cooling of bimetal 49 that free end 49a moves sufficiently to the rear to engage extension 158 thereby operating member 151 so that the OFF indicium of indicator means 150 is viewable through window 155. It is noted that spaced downward extensions 94c of member 94 (FIGURE 12B) act to guide the movement of member 151.

FIGURE 16 illustrates a typical hook-up for service indicator 25 when utilized in connection with an internal combustion engine 205. In this hook-up one terminal of indicator 25 is grounded through the mechanical connections with mounting plate 29 which in turn is grounded through screw means (not shown), extending through a plurality of the apertures 26a in plate 26, to the chassis of the vehicle. The other terminal of indicator 25 is connected through lead 35 and fuse 201 to the normally open contact of ignition switch 202. The other contact of switch 202 is connected to the positive terminal of battery 203 whose terminal is grounded. The ungrounded terminal of ignition system 204 for motor 205 is connected through lead 206 to the terminal of switch 202 having fuse 201 connected thereto. Thus, it is seen that service indicator 25 is energized only when ignition 204 is energized and that service indicator functions to record the servicing interval independently of the speed of engine 205.

In the event that switch arm 66 is not operated to disengage contact 65 after bimetal 49 has been heated to deflect a predetermined distance, the heat generated by coil 52 will heat safety bimetal 55 so that it deflects sufficiently to engage contact 58 connected through post 60 to lead 35. Since safety bimetal 55 is grounded, a short is thrown across heating coil 52 so that the latter no longer generates heat and at the same time the current passing through safety bimetal 55 will be of sufficient magnitude to rupture fuse 201 thereby interrupting power to service indicator 25.

It is noted that bimetal 49 is so constructed with respect to the other elements of service indicator 25 that the cooling portion of the bimetal heating-cooling cycle is much longer than the heating cycle. Typically, the cooling period is from ⅔ to ⅞ of the entire heating cycle. Because of this, in extremely cold weather the heating-cooling cycle will be much shorter than the heating-cooling cycle in cold weather. This is very desirable in that machines of the type being protected must be serviced more often during the winter than during the summer.

It is also noted that the energy supplied to coil 52 must be sufficient to enable bimetal 49 to overcome mechanical forces tending to retard deflection thereof. For the most part these forces consist of the force which must be exerted to load torison spring 113. The minimum or threshold power input to coil 52 required to overcome these mechanical forces is nine watts in a typical unit. It has been found that in order to obtain reliable operation it is necessary to supply at least two times and preferably three times the threshold power to coil 52. This provides the relatively short heating operation required of the heating-cooling cycle and produces a unit which is very accurate and reliable.

It is further noted that the peripheral edge of timing indicator wheel 80 is provided with suitable indicia indicating the operation of the servicing cycle which has elapsed. This indicia are viewable through the space 164 in the upturned portion 156 of magazine 36, with space 164 being in alignment with opening 157 of face plate 40 so that the indicia on timing indicator wheel 80 are viewable at the front of service indicator 25.

Briefly, the device hereinbefore described operates as follows. While ignition switch 202 is closed switch 65, 66 is closed so that upon closing of ignition switch 202 heater 52 is energized. The heat generated causes the free end 49a of bimetal 49 to deflect forwardly or to the left with respect to FIGURE 12. During the initial forward movement end 49a moves clear of tab 158 thereby permitting spring 154 to move OFF indicia on means 150 to a position out of line with aperture 155 in magazine extension 156. Continued forward movement of end 49a moves driving pawl 73 forward thereby driving primary ratchet wheel 77 in the direction of arrow 3 (FIGURE 3). When wheel 77 has advanced a distance between one and two teeth pawl 73 will have carried spring 70 over center thereby opening switch 65, 66.

Heater 52 is now deenergized and bimetal 49 cools with end 49a moving rearward carrying pawl 73 to the rear by a distance equal to more than the pitch between one and less than two teeth of ratchet wheel 77. Holding pawl finger 94a (FIGURE 12B) prevents reverse rotation of wheel 77. When pawl 73 carries spring 70 over center in the reverse direction switch 65, 66 closes and the heating cycle is repeated.

As long as ignition switch 202 remains closed the heating-cooling cycles repeat with pawl 73 causing primary ratchet wheel 77 to rotate with a step-by-step motion. Whenever pawl tip 76 falls behind an unobstructed deep tooth in primary wheel 77 tip 76 also engages a tooth of secondary ratchet wheel 85 thereby driving the latter.

Cam 89 is keyed to post 82 driven by secondary ratchet wheel 85 so that cam 89 and wheel 82 move together. As cam 89 rotates the camming edge 110 thereof in engagement with extension 111 moves driven means 47 rearward thereby loading spring 113. When extension 111 falls into sharp drop-off 110a of cam 89 the energy stored in spring 113 is suddenly released and driven means 47 snaps forward.

The projection 115 at the rear of driven means 47 engages the trailing edge of the topmost card 120a in magazine 36 catapulting card 120a forward through slit 122 in magazine 36. Movement of card 120a is arrested by spring finger 127 thereby maintaining card 120a in a position partially ejected from magazine 36. In this position card 120a is very conspicous yet spring finger 127 will prevent accidental removal thereof. Stop 131 just to the rear of card 120a in its partially ejected position prevents card 120a from being pushed back into magazine 36.

Indicator wheel 80, also being keyed to post 82, rotates together with cam 89. Indicia on the edge of wheel 80, viewable through opening 164 in magazine 36, show what portion of the servicing period has elapsed.

After the topmost card 120a has been partially ejected the operation previously described is repeated with the next card in stack 120 being partially ejected when driven means extension 111 falls into the sharp drop-off 110a of cam 89.

Thus, this invention provides a novel construction for a service indicating device in which cards arranged in a programmed sequence within a stack are partially ejected to indicate that servicing is required. These cards, in addition to carrying service indicating instructions may also be provided with apertures arranged in a coded sequence corresponding to the servicing instructions and identification for that vehicle being serviced. After the servicing instructions have been carried out the card is utilized to facilitate billing and/or statistical procedures.

While this invention has been described in connection with automotive engines that are operated in conjunction with an electrical source to drive the power unit a mechanical counter can be used to drive cam means. In the latter event appropriate switch means operated by the driven means can be used to deactivate an automatic machine after a predetermined number of articles have been produced by the machine. During the time the machine is not operated servicing or changeover procedures may be performed.

Although I have described preferred embodiments of my novel invention, many variations and modifications will now be obvious to those skilled in the art, and I prefer therefore to be limited not by the specific disclosure herein but only by the appended claims.

The embodiments of the invention in which an exclusive privilege or property is claimed are defined as follows:

1. In a service indicator the combination of a compartment having an openable cover, a stack of cards within said compartment, means biasing said stack away from said cover, said compartment including first means defining an elongated opening, second means for ejecting a card located on the side of said stack remote from said cover through said opening, said opening being too narrow to permit passage therethrough of more than one card at a time, all cards of said stack being of identical size and shape and a restricting means positioned to make the center of the opening narrower than the ends thereof.

2. The combination comprising a compartment having an openable cover, a stack of cards within said compartment, means remote from said cover and biasing said stack away from said cover, said compartment including first means defining an opening in the front end of said compartment, second means for ejecting a card located on the side of said stack remote from said cover through said opening, said opening being too narrow to permit passage therethrough of more than one card at a time, said means biasing said stack away from said cover including first and second members in engagement with the other side of the stack confronting said cover, said first member engaging said other side near the forward end of said stack adjacent to said opening, said second member engaging said other side near the rear end of said stack.

3. A service indicator as set forth in claim 2 in which the first and second members are each stiff wire elements having V-shaped sections with the apices of these sections being the only portions of said first and said second members in engagement with said other side of said stack.

4. The service indicator of claim 2 in which the means biasing said stack away from said cover includes a single spring element acting upon both said first and said second members.

5. The service indicator of claim 2 in which each of said first and said second members is pivotally supported at both the front and rear ends of the compartment.

6. The service indicator of claim 2 in which the means biasing said stack away from said cover includes a spring means external of said compartment and crank means through which force exerted by said spring means is transmitted to said first and said second members.

7. The service indicator of claim 6 in which the spring means and crank means are so connected that said spring means exerts a component of force directed at right angles to said crank means whenever said first and said second members are in engagement with said stacks, said component of force being an increasing percentage of the total force exerted by said spring means as said stack decreases in size, said crank means positioned external of said compartment.

8. The service indicator of claim 7 in which the total force exerted by said spring means decreases as said stack decreases in size.

9. The service indicator of claim 7 in which the first and second members include sections disposed within said compartment and occupying angular positions displaced from angular positions occupied by said crank means said first and said second members are pivotally mounted and the spring means is a single element urging said first and said second members to pivot in opposite directions into engagement with the other side of the stack.

10. A service indicator comprising a drive means, an electric circuit which when closed and energized actuates said drive means, an actuator means driven by said drive means, a compartment, a stack of cards disposed within said compartment, said cards arranged in a programmed sequence, said actuator means having a part in engagement with a card at a first side of said stack, means energized by said drive means for operating said actuator means through a complete uninterruptable feed stroke after a predetermined operation of said drive means, said actuator means when operated driving said card forward along a feed path to a position in which said card is partially ejected from said compartment through an opening therein to a position where the card is remote from a means which will completely remove the card from the compartment, a stop element biased toward said feed path, said card when fully within said compartment forcing said stop element away from said feed path, said stop element disposed to assume a position on said feed path behind the trailing edge of said card when the latter is in said position where it is partially ejected whereby said stop element blocks movement of said card along said feed path back into said compartment.

11. A service indicator comprising a drive means, an electric circuit which when closed and energized actuates said drive means, an acutator means driven by said drive means, a compartment, a stack of cards disposed within said compartment, said cards arranged in a programmed sequence, said actuator means having a part in engagement with a card at a first side of said stack, means energized by said drive means for operating said actuator means through a complete uninterruptable feed stroke after a predetermined operation of said drive means, said actuator means when operated driving said card forward along a feed path to a position in which said card is partially ejected from said compartment through an opening therein to a position where the card is remote from a means which will completely remove the card from the compartment, said drive means including an electric circuit and a bimetallic strip subjected to heating energy generated by the passage of current through said electric circuit, said bimetallic strip being operated in a heating-cooling cycle, said cycle being divided into a heating portion during which current flows in said circuit and a cooling portion during which current flow in said circuit is discontinued, said cooling portion being materially longer than said heating portion, heating energy furnished to said bimetallic strip being at least twice the minimum energy required to overcome the mechanical forces acting in opposition to deflection of said strip.

12. A service indicator comprising a drive means, an electric circuit which when closed and energized actuates said drive means, an actuator means driven by said drive means, a compartment, a stack of cards disposed within said compartment, said cards arranged in a programmed sequence, said actuator means having a part in engagement with a card at a first side of said stack, means energized by said drive means for operating said actuator means through a complete uninterruptable feed stroke after a predetermined operation of said drive means, said actuator means when operated driving said card forward along a feed path to a position in which said card is partially ejected from said compartment through an opening therein to a position where the card is remote from a means which will completely remove the card from the compartment, said drive means including an electric circuit and a bimetallic strip subjected to heating energy generated by the passage of current through said electric circuit, said bimetallic strip being operated in a heating-cooling cycle, said cycle being divided into a heating portion during which current flows in said circuit and a cooling portion during which current flow in said circuit is discontinued, said cooling portion being materially longer than said heating portion, heating energy furnished to said bimetallic strip being at least three times the minimum energy required to overcome the mechanical forces acting in opposition to deflection of said strip.

13. A service indicator comprising a drive means, an electric circuit which when closed and energized actuates said drive means, an actuator means driven by said drive means, a compartment, said cards arranged in a programmed sequence, said actuator means having a part in engagement with a card at a first side of said stack, means energized by said drive means for operating said actuator means through a complete uninterruptable feed stroke after a predetermined operation of said drive means, said actuator means when operated driving said card forward along a feed path to a position in which said card is partially ejected from said compartment through an opening therein to a position where the card is remote from a means which will completely remove the card from the compartment, said means energized by said drive means comprising a spring which biases the actuator means in a direction to drive a card forward through the opening in the compartment, a plate cam means interposed between said actuator means and said drive means, said spring biasing a follower portion of said actuator in a plane parallel to said cam means against said cam means, said cam means having a sharp drop off which when engaged by said follower portion causes energy stored in said spring to be released suddenly with the sudden release of energy stored in the spring driving said actuator forward with a driver portion of said portion engaging the trailing edge of the card thereby catapulting said card forward to a partially ejected position wherein the trailing edge is forward of said driver portion.

14. A service indicator comprising a drive means, an electric circuit which when closed and energized actuates said drive means, an acutator means driven by said drive means, a compartment, a stack of cards disposed within said compartment, said cards arranged in a programmed sequence, said actuator means having a part in engagement with a card at a first side of said stack, means energized by said drive means for operating said actuator means through a complete uninterruptable feed stroke after a predetermined operation of said drive means, said actuator means when operated driving said card forward along a feed path to a position in which said card is partially ejected from said compartment through an opening therein to a position where the card is remote from a means which will completely remove the card from the compartment, a housing enclosing said drive means, means including an element viewable from a point external of said housing for indicating at any given instant the portion of said predetermined operation of said drive means which has occured.

15. A service indicator comprising a drive means, an electric circuit which when closed and energized actuates said drive means, an actuator means driven by said drive means, a compartment, a stack of cards disposed within said compartment, said cards arranged in a programmed sequence, said actuator means having a part in engagement with a card at a first side of said stack, means energized by said drive means for operating said actuator means through a complete uninterruptable feed stroke after a predetermined operation of said drive means, said actuator means when operated driving said card forward along a feed path to a position in which said card is partially ejected from said compartment through an opening therein to a position where the card is remote from a means which will completely remove the card from the compartment, said means energized by said drive means comprising a spring which biases the actuator means in a direction to drive a card forward through the opening in the compartment, a plate cam means interposed between said actuator means and said drive means, said spring biasing a follower portion of said actuator in a plane parallel to said cam means against said cam means, said cam means having a sharp drop off which when engaged by said follower portion causes energy stored in said spring to be released suddenly, another ratchet wheel interposed between said ratchet wheel and said cam means, coordinating means for operating said ratchet wheels in a timed realtionship, and an operative connection between said cam means and said another ratchet wheel whereby operation of the latter is effective to operate the former.

16. The service indicator of claim 15 in which the ratchet wheels are mounted for rotation about a common axis, said coordination means including a first set of teeth along the peripheral edge of said ratchet wheel and a second set of teeth along the peripheral edge of said another ratchet wheel, and a driving pawl, said drive means imparting a motion to said pawl in a driving direction, said pawl mounted for reciprocating motion in said driving direction and a return direction, said first of said teeth including a plurality of relatively shallow teeth and at least one deep tooth, said pawl in driving engagement with a tooth of said first set of teeth during each driving movement of said pawl, said pawl in driving engagement with a tooth of said second set of teeth only when said pawl is in driving engagement with a deep tooth of said first set of teeth.

17. The service indicator of claim 16 in which said ratchet wheel carries a blocking member operatively positioned with a particular deep tooth of said first set of teeth to prevent said pawl from driving said another ratchet wheel even when said pawl is in driving engagement with said particular deep tooth.

18. The service indicator of claim 17 in which the blocking member is selectively movable to an inoperative position wherein said pawl is in driving engagement with said another ratchet wheel when said pawl is in driving engagement with said particular deep tooth.

19. A service indicator comprising a drive means, an electric circuit which when closed and energized actuates said drive means, an actuator means driven by said drive means, a compartment, a stack of cards disposed within said compartment, said cards arranged in a programmed sequence, said actuator means having a part in engagement with a card at a first side of said stack, means energized by said drive means for operating said actuator means through a complete uninterruptable feed stroke after a predetermined operation of said drive means, said actuator means when operated driving said card forward along a feed path to a position in which said card is partially ejected from said compartment through an opening therein to a position where the card is remote from a means which will completely remove the card from the compartment, said means energized by said drive means comprising a spring which biases the actuator means in a direction to drive a card forward through the opening in the compartment, a plate cam means interposed between said actuator means and said drive means, said spring biasing a follower portion of said actuator in a plane parallel to said cam means against said cam means, said cam means having a sharp drop off which when engaged by said follower portion causes energy stored in said spring to be released suddenly, a toothed ratchet wheel and a driving pawl in engagement with the teeth of said ratchet wheel for driving said ratchet wheel with a stepped motion in a first direction, means for transferring motion from said ratchet wheel to said cam means, said drive means imparting a motion to said pawl in a driving direction, said pawl mounted for reciprocating motion in said driving direction and a return direction, a holding pawl in engagement with said teeth for preventing movement of said ratchet wheel in a direction reverse to said first direction, motion of said driving pawl in said driving direction exceeding the motion necessary to advance said ratchet wheel by one tooth pitch but less than the pitch of two teeth, motion of said driving pawl in said return direction exceeding one tooth pitch but less than the pitch of two teeth.

20. A service indicator comprising a drive means, an electric circuit which when closed and energized actuates said drive means, an actuator means driven by said drive means, a compartment, a stack of cards disposed within said compartment, said cards arranged in a programmed sequence, said actuator means having a part in engagement with a card at a first side of said stack, means energized by said drive means for operating said actuator means through a complete uninterruptable feed stroke after a predetermined operation of said drive means, said actuator means when operated driving said card forward along a feed path to a position in which said card is partially ejected from said compartment through an opening therein to a position where the card is remote from a means which will completely remove the card from the compartment, said means energized by said drive means comprising a spring which biases the actuator means in a direction to drive a card forward through the opening in the compartment, a plate cam means interposed between said actuator means and said drive means, said spring biasing a follower portion of said actuator in a plane parallel to said cam means against said cam means, said cam means having a sharp drop off which when engaged by said follower portion causes energy stored in said spring to be released suddenly, a toothed ratchet wheel and a driving pawl in engagement with the teeth of said ratchet wheel for driving said ratchet wheel with a stepped motion in a first direction, means for transferring motion from said ratchet wheel to said cam means, said drive means imparting a motion to said pawl in a driving direction, said pawl mounted for reciprocating motion in said driving direction and a return direction, a visual indicator to show whether the service indicator is energized, said visual indicator including biasing means urging said visual indicator to a first position indicating that said service indicator is de-energized, said drive means when energized operating said visual indicator to a second position indicating that said service indicator is energized.

21. The service indicator of claim 20 in which the driving pawl is mounted for movement between a rest and an advanced position, said driving pawl being in said rest position when said indicator device is deenergized for an extended period of time, said driving pawl normally operating between said advanced position and an intermediate position, said visual indicator remaining in said second position while said driving pawl moves between said intermediate and advanced positions.

22. A service indicator comprising a drive means, an electric circuit which when closed and energized actuates said drive means, an actuator means driven by said drive means, a compartment, a stack of cards disposed within said compartment, said cards arranged in a programmed sequence, said actuator means having a part in engagement with a card at a first side of said stack, means energized by said drive means for operating said actuator means through a complete uninterruptable feed stroke after a predetermined operation of said drive means, said actuator means when operated driving said card forward along a feed path to a position in which said card is partially ejected from said compartment through an opening therein to a position where the card is remote from a means which will completely remove the card from the compartment, means for indicating at any given instant the portion of said predetermined operation of said drive means which has occurred, said means last recited including a wheel carrying visual indicia which are viewable from a point external of said service indicator.

23. A service indicator comprising a drive means, an electric circuit which when closed and energized actuates said drive means, an actuator means driven by said drive means, a compartment, a stack of cards disposed within said compartment, said cards arranged in a programmed sequence, said actuator means having a part in engagement with a card at a first side of said stack, means energized by said drive means for operating said actuator means through a complete uninterruptable feed stroke after a predetermined operation of said drive means, said actuator means when operated driving said card forward along a feed path to a position in which said card is partially ejected from said compartment through an opening therein to a position where the card is remote from a means which will completely remove the card from the compartment, said drive means including an electric circuit and a bimetallic strip subjected to heating energy generated by the passage of current through said electric circuit, a safety means to discontinue heating of said bimetallic strip when the temperature thereof exceeds a predetermined limit but before said service indicator is damaged.

24. A service indicator as set forth in claim 23 in which the safety means includes an element for short circuiting a portion of said electric circuit constituting a heater for said bimetallic strip.

25. A service indicator as set forth in claim 24 in which the element is another bimetallic strip mounted for response to heat generated by said current through said electric circuit.

References Cited by the Examiner

UNITED STATES PATENTS

| 580,736 | 4/97 | Smith | 221—15 X |
|---|---|---|---|
| 1,205,073 | 11/16 | Anderson | 221—60 X |
| 2,009,601 | 7/35 | Anderson. | |
| 2,027,672 | 1/36 | Broeren | 221—60 |
| 2,624,453 | 1/53 | Muros | 221—232 |

FOREIGN PATENTS 369,649    3/32    Great Britain.

LOUIS J. DEMBO, *Primary Examiner.*

HADD S. LANE, *Examiner.*